(12) United States Patent
Fischler et al.

(10) Patent No.: US 9,383,571 B2
(45) Date of Patent: *Jul. 5, 2016

(54) MODULAR TELESCOPE

(75) Inventors: Siegmund Fischler, Absam (AT);
Patrick Kurz, Zirl (AT)

(73) Assignee: Swarovski-Optik KG. (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,156

(22) Filed: Dec. 23, 2011

(65) Prior Publication Data

US 2012/0162759 A1    Jun. 28, 2012

(30) Foreign Application Priority Data

Dec. 23, 2010   (AT) ................ A 2133/2010

(51) Int. Cl.
| G02B 7/04 | (2006.01) |
| G02B 23/00 | (2006.01) |
| G02B 23/16 | (2006.01) |

(52) U.S. Cl.
CPC .............. *G02B 23/145* (2013.01); *G02B 23/00* (2013.01); *G02B 23/16* (2013.01)

(58) Field of Classification Search
CPC ...... G02B 23/14–23/145; G02B 23/00–23/08; G02B 7/04; G02B 7/14; G02B 15/00–15/12; G02B 25/001; G02B 7/02–7/028; G03B 17/12; G03B 17/14
USPC ......... 359/399–435, 676, 694–696, 699–706, 359/822–830; 396/72–88
See application file for complete search history.

(56) References Cited

U.S. PATENT DOCUMENTS

| 2,662,443 A | 12/1953 | Loeck |
| 3,504,965 A | 4/1970 | Lustig |
| 3,981,021 A * | 9/1976 | Beecher ................. G03B 17/48 396/432 |
| 4,249,793 A | 2/1981 | Uehara |
| 4,249,799 A * | 2/1981 | Iglesias ......................... 359/827 |
| 4,293,185 A | 10/1981 | Yamazaki et al. |
| 4,302,077 A * | 11/1981 | Sato ...................... G03B 17/14 359/828 |

(Continued)

FOREIGN PATENT DOCUMENTS

| CN | 2718606 Y | 8/2005 |
| CN | 201364409 Y | 12/2009 |

(Continued)

OTHER PUBLICATIONS

Austrian Application No. 2131/2010 filed Dec. 23, 2010. (English translation of abstract only).

(Continued)

*Primary Examiner* — Bumsuk Won
*Assistant Examiner* — Jeffrey Madonna
(74) *Attorney, Agent, or Firm* — Lerner, David, Littenberg, Krumholz & Mentlik, LLP

(57) ABSTRACT

A telescope made up of mutually connectable modules, which telescope comprises at least a lens module and an eyepiece module, and the lens module and eyepiece module each have a connection interface for connecting the modules, and at least one adjusting means for focusing and at least one adjusting means for changing the image magnification are provided, and one of the adjusting means is disposed on the lens module in the region of the connection interface of the lens module and the other one of the adjusting means is disposed on the eyepiece module in the region of the connection interface (5) of the eyepiece module.

11 Claims, 5 Drawing Sheets

(56) References Cited

U.S. PATENT DOCUMENTS

| | | | |
|---|---|---|---|
| 4,488,037 A | 12/1984 | Ishibai et al. | |
| 4,600,277 A | 7/1986 | Murray, Jr. | |
| 4,873,580 A | 10/1989 | Katoh et al. | |
| 5,053,794 A * | 10/1991 | Benz | 359/819 |
| 5,305,142 A * | 4/1994 | Phillips | G02B 23/12 250/214 VT |
| 5,453,875 A | 9/1995 | Kolsch et al. | |
| 5,604,630 A | 2/1997 | Palmer | |
| 5,644,425 A | 7/1997 | Palmer | |
| 5,663,834 A | 9/1997 | Koizumi | |
| 5,737,119 A * | 4/1998 | Mladjan et al. | 359/353 |
| 5,737,131 A | 4/1998 | Palmer | |
| 5,764,410 A | 6/1998 | Jibiki | |
| 5,796,516 A | 8/1998 | Palmer | |
| 5,838,289 A * | 11/1998 | Saito | G09G 3/20 345/212 |
| 5,867,313 A * | 2/1999 | Schweitzer et al. | 359/418 |
| 5,877,892 A | 3/1999 | Nakamura et al. | |
| 5,898,519 A * | 4/1999 | Palmer | G02B 23/12 250/214 VT |
| 5,943,174 A | 8/1999 | Bryant et al. | |
| 5,959,770 A | 9/1999 | Perkins et al. | |
| 6,061,182 A | 5/2000 | Carmeli et al. | |
| 6,131,294 A * | 10/2000 | Jibiki | 42/119 |
| 6,508,026 B1 * | 1/2003 | Uppiano | F41G 1/38 42/111 |
| 6,515,806 B2 * | 2/2003 | Denpo | G02B 7/14 359/694 |
| 6,538,811 B2 * | 3/2003 | Meier | G02B 23/12 359/350 |
| 6,598,332 B1 | 7/2003 | Jibiki | |
| 7,085,491 B2 | 8/2006 | Chiang | |
| 7,246,956 B2 | 7/2007 | Pernstich et al. | |
| 7,706,062 B2 | 4/2010 | Ramboyong et al. | |
| 7,795,574 B2 | 9/2010 | Kennedy et al. | |
| 2001/0019459 A1 | 9/2001 | Denpo | |
| 2002/0191282 A1 | 12/2002 | Edwards | |
| 2003/0214708 A1 * | 11/2003 | Muller | G02B 23/16 359/399 |
| 2004/0141232 A1 | 7/2004 | Luthardt et al. | |
| 2004/0150882 A1 * | 8/2004 | Lederman | G02B 23/18 359/425 |
| 2004/0212878 A1 | 10/2004 | Regan et al. | |
| 2005/0099684 A1 | 5/2005 | Mogamiya et al. | |
| 2006/0056085 A1 * | 3/2006 | Kuo | G02B 7/04 359/825 |
| 2006/0262391 A1 | 11/2006 | Thomas | |
| 2010/0134882 A1 | 6/2010 | Tautz | |
| 2010/0290112 A1 | 11/2010 | Kaneko et al. | |
| 2012/0069432 A1 | 3/2012 | Liang | |
| 2012/0162757 A1 * | 6/2012 | Roider et al. | 359/422 |
| 2012/0162758 A1 | 6/2012 | Zimmermann et al. | |
| 2012/0162759 A1 | 6/2012 | Fischler et al. | |

FOREIGN PATENT DOCUMENTS

| | | |
|---|---|---|
| DE | 7602798 U1 | 7/1976 |
| DE | 2717574 A1 | 2/1978 |
| DE | 3208814 A1 | 9/1983 |
| DE | 4231655 C1 | 11/1993 |
| DE | 9408059 U1 | 9/1995 |
| DE | 102004001481 B4 | 12/2006 |
| DE | 102008042221 A1 | 4/2010 |
| EP | 1116978 A2 | 7/2001 |
| GB | 2404993 A | 2/2005 |
| JP | 58065013 U | 5/1983 |
| JP | 08334703 A | 12/1996 |
| JP | 2001194595 A | 7/2001 |
| WO | 9531747 A1 | 11/1995 |
| WO | 02088840 A1 | 11/2002 |

OTHER PUBLICATIONS

Austrian Application No. 2132/2010 filed Dec. 23, 2010. (English translation of abstract only).

* cited by examiner

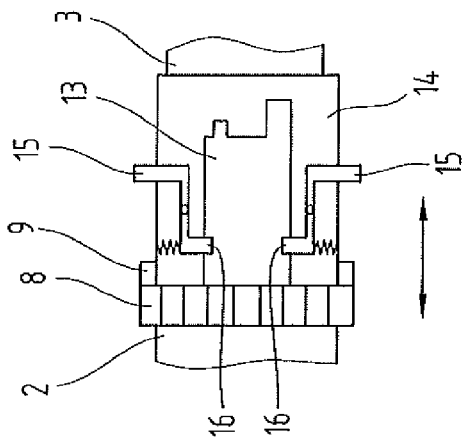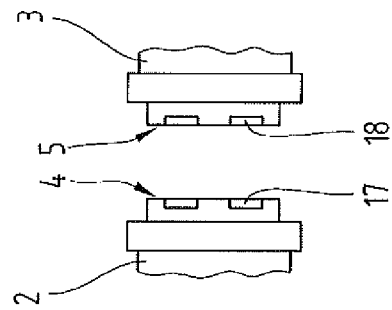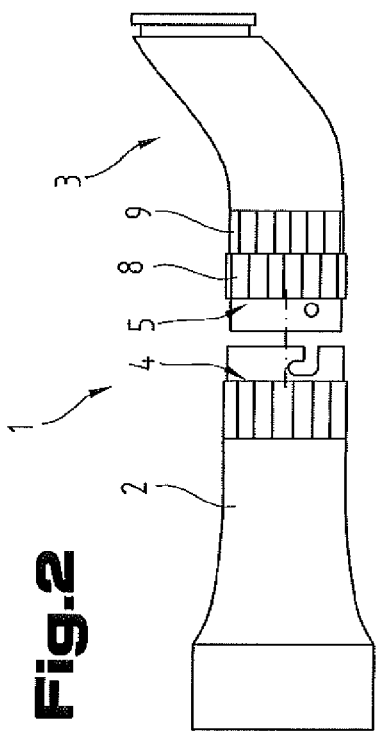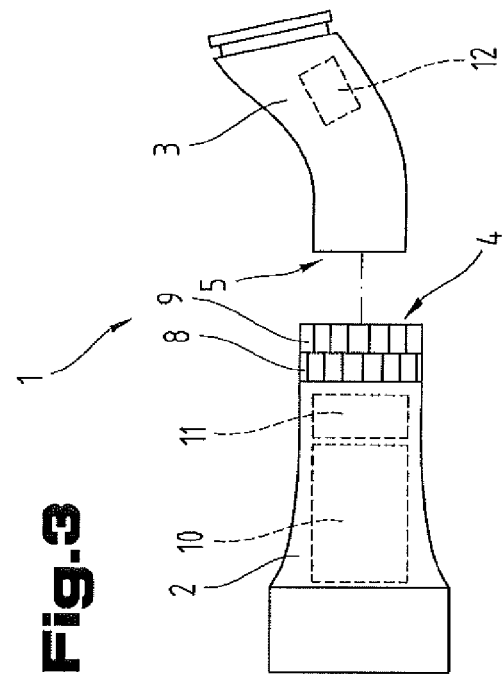

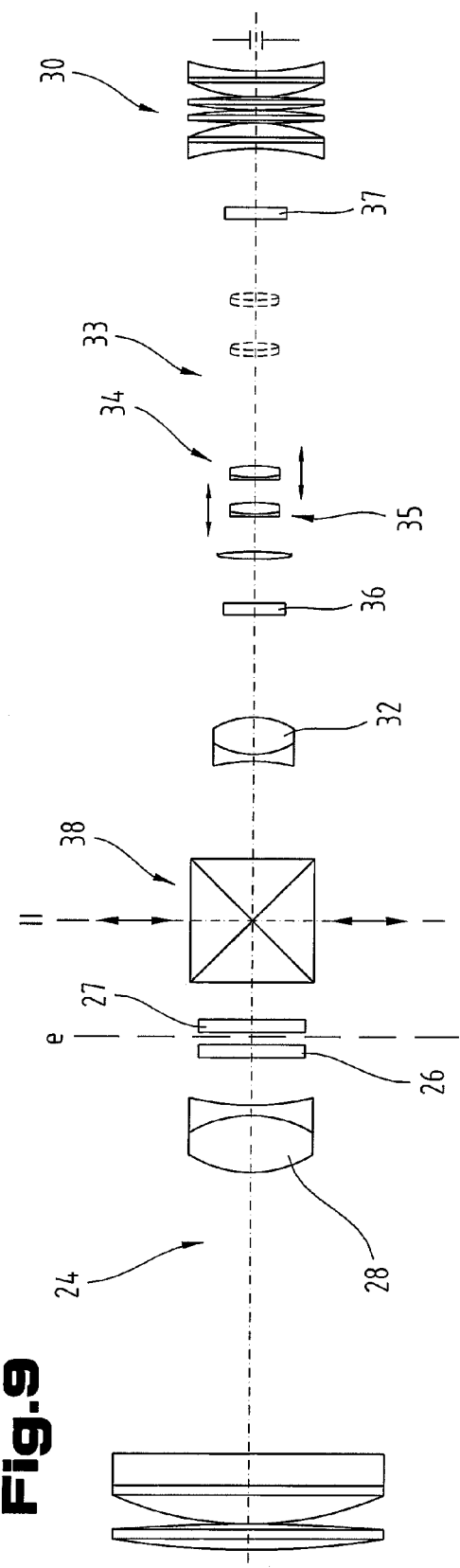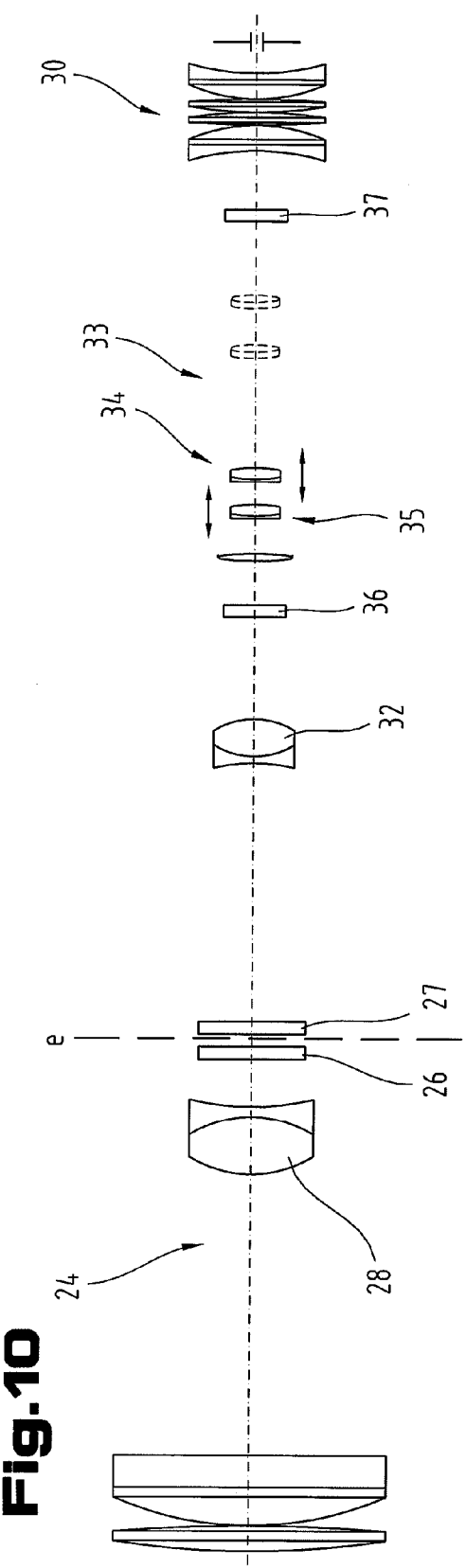

MODULAR TELESCOPE

BACKGROUND OF THE INVENTION

The invention relates to a telescope made up of modules which can be connected to one another, and the telescope comprises at least a lens module and an eyepiece module and the lens module and eyepiece module each have a connection interface for connecting the modules, and at least one adjusting means for focusing and at least one adjusting means for zooming are provided.

Document DE9408059U1 discloses a telescope system for observing and photographing objects based on a modular design. The known design comprises a lens and an image evaluation unit, for example in the form of a camera which can be used instead of an eyepiece. For focusing purposes, a focusing unit is provided, and a central unit is provided between the lens and focusing unit. The image evaluation unit is fitted on the focusing unit by means of an interchangeable module unit.

BRIEF SUMMARY OF THE INVENTION

The disadvantage of the known design, especially in the case of larger telescopes used for observing birds amongst other things, is that there is a relatively large distance between the focusing unit, spaced apart from a lens module by the central unit, and an operating means for the zoom due to the structural design. This makes it relatively difficult to handle the telescope because it is necessary to use two hands in order to change the image magnification whilst simultaneously adapting the focus. Since an appropriate tripod or suitable support is not always available, a situation can arise in which it is not possible to adjust the image magnification and focus simultaneously. The time delay occurring as a result is very annoying, especially when observing wild animals and in particular when observing birds, because the observed objects can change their position within the shortest of times. Apart from this, the telescope may wobble due to awkward manipulation of the adjusting means for the zoom and focus. Given the large distances from which a wild animal is observed, even slight wobbling can mean that the observed object disappears from the field of vision.

Accordingly, the objective of the invention is to increase the ease of use of a modular telescope and minimize subjective disruption caused by the process of setting the image magnification and focus. The invention should also offer the best dismantling system possible for the telescope to obtain a packing size of the smallest dimensions. The process of switching to lenses of different diameters should also be simpler and as quick as possible, as should the process of fitting eyepiece modules with different functions.

These objectives are achieved by the invention on the basis of a modular telescope of the type outlined above due to the fact that one of the adjusting means is disposed on the lens module in the region of the connection interface of the lens module and the other one of the adjusting means is disposed on the eyepiece module in the region of the connection interface.

An advantage gained by the invention is the fact that the adjusting means are disposed very close together in spatial terms, thereby enabling both the adjusting means for the zoom and the adjusting means for the focus to be operated with one hand.

At this stage, it should be pointed out that the expressions "zoom" and "changing the image magnification" or "variable image magnification" are all used synonymously. The same applies to use of the expressions "focusing" and "setting the focus" in this document.

In order to make it easy to adapt the optical settings, the telescope may have at least one adjusting means for focusing and at least one adjusting means for changing the zoom.

The at least one adjusting means for changing the zoom may be disposed on the lens module or on the eyepiece module in the case of one advantageous variant of the invention, in which case the at least one adjusting means for focusing may be disposed on the lens module or on the eyepiece module.

To ensure very good ease of use, at least one of the adjusting means may be disposed in the region of one of the connection interfaces.

Operation and handling of the telescope can be further improved due to the fact that one of the adjusting means is disposed on the lens module in the region of the connection interface of the lens module and the other one of the adjusting means is disposed on the eyepiece module in the region of the connection interface of the eyepiece module.

In the case of one embodiment of the invention which is distinctive due to the fact that it is particularly easy to operate, the adjusting means are provided in the form of setting rings, the end faces of which lie in planes disposed parallel with a separating/connecting plane of the lens module and eyepiece module. Using parallel setting rings means that it is possible to set the telescope with one hand.

In the case of one particularly advantageous embodiment of the invention, at least certain portions of the adjusting means lie in a dividing plane of the connection interfaces. This means that the adjusting means can be disposed especially close to one another in spatial terms, thereby further facilitating manipulation. When the eyepiece and lens module are directly connected to one another, the adjusting means lie in a dividing plane of the connection interfaces of the eyepiece and lens modules, which means that the adjusting means can be disposed immediately adjacent to one another in this embodiment.

Based on one advantageous variant of the invention, a respective bayonet closure may be formed by two connection interfaces cooperating directly with one another. This embodiment offers a particularly simple way of connecting the modules. At this stage, it should be pointed out that the expression bayonet closure used in this connection refers to any type of push-fit/rotating closure.

Based on another very advantageous embodiment of the invention, two respective directly cooperating connection interfaces may form a plug and socket connection which can be released from one another by an axial pushing action and for releasing purposes, at least one retaining element used to connect at least one cooperating operating element and the connection interfaces to one another is forced back into a releasing position. This variant of the invention offers a very simple connection of the individual modules because only a translating movement of the connection interfaces is required.

The mechanical stability of the connection between the modules can be improved due to the fact that two connection interfaces directly cooperating with one another each have a surface profile that is not a flat shape, as a result of which one connection interface has at least certain portions provided in the shape of a male part and the other interface is designed with at least certain portions in the shape of a female part.

In the case of another variant of the invention, two connection interfaces cooperating directly with one another can be screwed to one another.

A check can be made to ensure that the modules have been correctly connected to one another due to the fact that at least one switch is provided on at least one of the connection interfaces, which is operated when the connection interfaces have been correctly connected.

Based on one variant of the invention which permits only the use of original parts which fit with one another, several switches may be provided, in which case when the connection interfaces are in a connected state, a pre-definable combination of the switches is operated, and an electrical contact between the lens module and eyepiece module and/or a data connection between the lens module and eyepiece module is not established until the switches have been operated in the pre-defined combination.

The switches can be particularly well protected due to the fact that the switches are provided in the form of reed switch contacts. The particular advantage of this embodiment is that the switches do not need to be disposed on the surface of the connection interfaces, which means that they are invisible from the outside. Complementary surfaces of the other connection interface cooperating with the switches may be fitted with appropriate magnets, preferably permanent magnets. Accordingly, two connection points cooperating directly with one another form a reed contact relay.

In the case of one particularly advantageous variant of the invention which is distinctive due to a plurality of functional options, the eyepiece module is a multi-function module incorporating other functions, in particular a distance measuring function, a photo function, video or night vision function.

Based on one advantageous embodiment of the invention, the other functions are operated using the viewing passage of the lens module. One of the advantages of this is that information can also be faded into the optical path and displayed to the user. This solution also offers a very compact design.

In the case of another variant of the invention, an eyepiece optical system is fixedly integrated in the eyepiece module. As a result of this variant of the invention, the design of the eyepiece module can be simplified.

To provide a clearer understanding, the invention will be explained in more detail below with reference to the appended drawings.

BRIEF DESCRIPTION OF THE DRAWINGS

These are highly schematic, simplified diagrams illustrating the following:

FIG. 2 is a variant of a telescope proposed by the invention with the lens module and eyepiece module separated from one another;

FIG. 3 is another variant of a telescope proposed by the invention with the lens module and eyepiece module separated from one another;

FIG. 4 is a variant of a connection interface showing greater detail;

FIG. 5 is another variant of a connection interface in greater detail;

FIG. 9 is a second variant of an optical design of a telescope proposed by the invention;

FIG. 10 is a third variant of an optical design of a telescope proposed by the invention.

DETAILED DESCRIPTION

Figure 1:
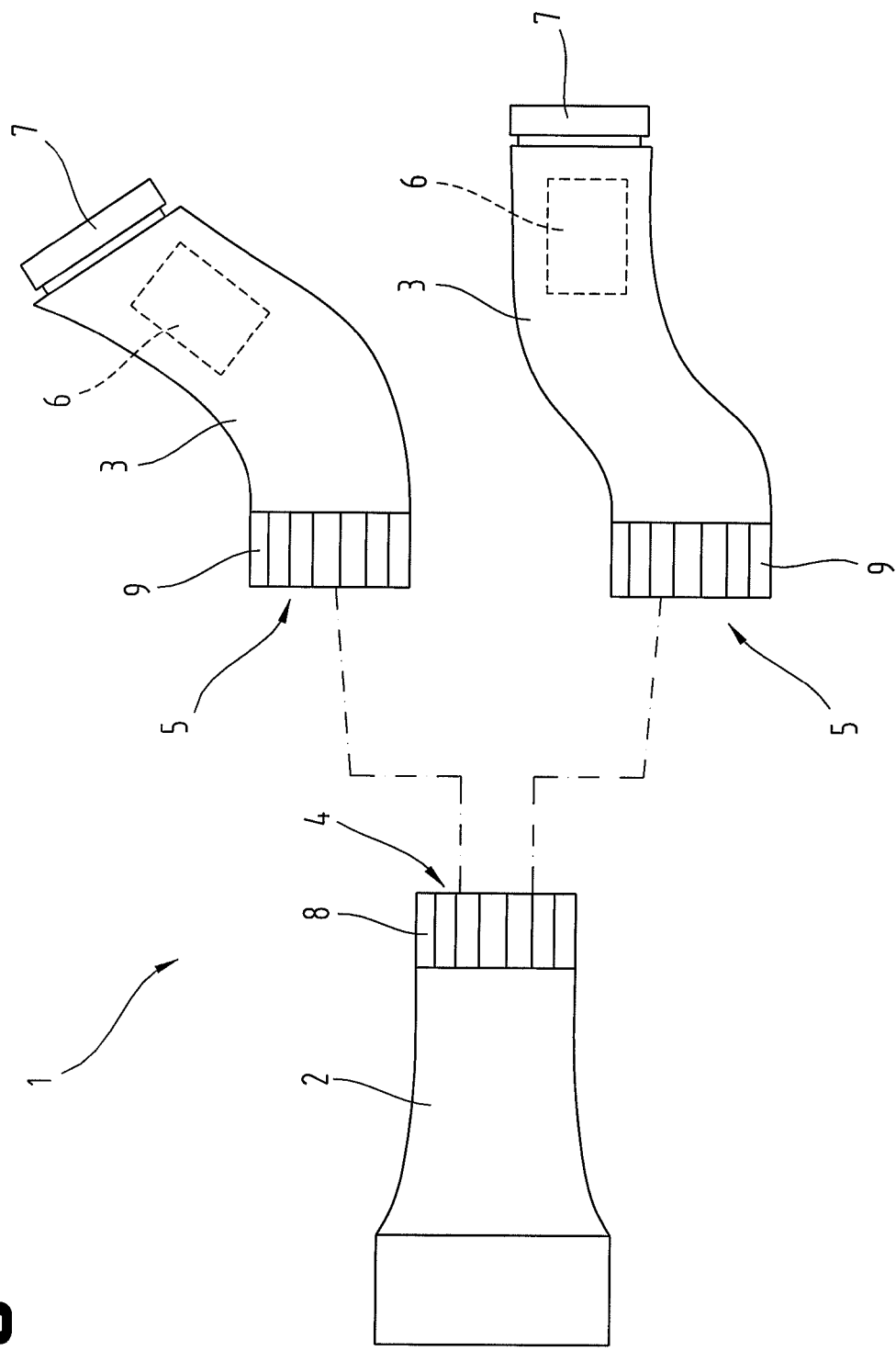
FIG. 1 is a telescope proposed by the invention with the lens module and eyepiece module separated from one another.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

As illustrated in FIG. 1, a telescope 1 proposed by the invention comprises a lens module 2 and an eyepiece module 3. FIG. 1 illustrates two different eyepiece modules 3 which may be connected to the lens module 2 as alternatives. The lens module 2 and the eyepiece module 3 in turn each have a connection interface 4, 5 for connecting the modules 2, 3. Although the variant of the invention illustrated here is a telescope 1 with a monocular, it may be that instead of an eyepiece module 3 with only one eyepiece, an eyepiece module 3 with a binocular may also be used. Another option would be to provide a prism part and other optical components in the eyepiece module. For example, a unit 6 for reversing the image and an eyepiece 7 with variable image magnification may be integrated in the eyepiece module 3. As an alternative to providing an eyepiece 7 with variable image magnification in the eyepiece module 3, an optical system or unit for changing the image magnification might be integrated in the lens module 2, as illustrated in FIG. 3. In FIG. 3, this optical system or unit is indicated by reference number 10.

The eyepiece 7 and the unit 10 for changing the image magnification may also be designed as a common unit. The unit 10 may also be used as a means of reversing the image and may be provided in the form of a prism system, for example.

Based on one embodiment of the invention, the unit for changing the image magnification and the unit 6 for reversing the image may also be designed as a common unit. The common unit for changing the image magnification and reversing the image may also be designed as a lens system which reproduces an image in a first intermediate image plane with a variable scale and reversed in a second intermediate image plane. A respective graticule plate may be provided at the points where the intermediate image planes are disposed. It would also be possible to provide a graticule plate at the point of only one of the intermediate image planes (see also the embodiments illustrated in FIGS. 7 to 9). It would also be possible to provide a graticule plate at the point of only one intermediate image plane.

The lens module 2 may have an adjusting means 8 in the region of its connection interface 4 for zooming and the eyepiece module 3 may have an adjusting means 9 for focusing in the region of its connection interface 5. However, it would also be possible for the zooming and focusing means to be disposed the other way round.

It would also be possible for both the adjusting means 8, 9 to be provided on the eyepiece module 2, as illustrated in FIG. 2. This may be of particular advantage if the eyepiece module 3 has an eyepiece for zooming and focusing.

As illustrated in FIG. 3, the adjusting means 8 and 9 may also be disposed on the lens module 2. This is primarily of advantage if an optical system 10 for changing the image magnification and an optical system 11 for sharpening or focusing is integrated in the lens module 2. In the case of this variant of the invention, it is of particular advantage if the eyepiece optical system is fixedly integrated in the eyepiece module 3.

The adjusting means 8, 9 may be designed as setting rings, the end faces of which lie in planes parallel with a separating/connecting plane of the lens module 2 and eyepiece module 3. As may also be seen from the diagrams, at least portions of the adjusting means 8, 9 may lie in a dividing plane of the connection interfaces 4, 5. Although the adjusting means 8 and 9 illustrated here are provided in the form of setting rings, it should be pointed out at this stage that the adjusting means 8 and 9 might also be designed as operating knobs or keys.

Based on other embodiments of the invention, the eyepiece module 3 may be designed as a multi-function module and incorporate additional functions. For example, the eyepiece module 3 may be designed as a video recording device, digital camera, residual light enhancer, infra-red illumination, distance meter, optical signaling module, a module for fading information and data into the visual optical path, an image stabilization module, etc. With this variant of the invention, therefore, the other functions may be operated using the viewing passage of the lens module.

It is of particular advantage if the eyepiece module 3 is designed as a unit 12 for fading in additional data, in particular geographical data, relating to the current site of use. To this end, the eyepiece module 3 or telescope 1 may have a receiver of a position detecting system, for example of the GPS system. Information stored in a data bank can be displayed on the basis of the current positioning data. To this end, specific information may be correlated with value ranges of geographical positioning data. The data bank may be stored in a memory of the telescope 1 or eyepiece module 3 or in a server which can be contacted via a radio network. If it is possible to access the data bank via a radio network, for example the GSM network, the telescope 1 or eyepiece module 3 may be equipped with an appropriate communication module. In addition, an electronic compass may be provided in the telescope 1 or in the eyepiece module 3. The data from the electronic compass may be used to determine in which direction the lens of the telescope 1 is being held. The geographical location of the telescope 1 and the viewing direction of the telescope 1 determined may then be used as selection criteria for displaying data. For example, names of mountains or other geographical objects may be displayed.

What information is be displayed may also be selected from a menu displayed in an optical path or on an external image screen, which can advantageously be retrieved by means of an externally accessible operating element, such as a switch or setting wheel disposed on the telescope 1 or eyepiece module 3, for example.

It should also be pointed out that the telescope 1 may have an extension for inserting in a cooperating shoe of a tripod.

Based on one variant of the invention, two connection interfaces 4, 5 cooperating directly with one another may respectively form a bayonet closure.

In the case of another embodiment, the two connection interfaces 4, 5 cooperating directly with one another may screw together to form a bayonet closure, in which case the connection interfaces may have mutually cooperating screw threads.

As illustrated in FIG. 4, two connection interfaces 13, 14 cooperating directly with one another may also form a plug and socket connection which can be released by an axial sliding action. One or more retaining elements 16 cooperating with one or more corresponding operating elements may be pushed back in order to release the connection interfaces 13, 14. The retaining elements 16 may be designed as resiliently elastic catch lugs. When the operating elements 15, which may be projections of the retaining elements 16, are pushed, the retaining elements 16 may be moved out of engagement with cooperating recesses of the connection interface 13. When the operating elements are not activated, the retaining elements are moved by the spring force in the direction of the connection interface 13. The retaining elements 16 may be disposed on the outer connection interface 14. When the retaining elements 16 are triggered, i.e. when the operating elements 15 are activated, the connection interfaces 13, 14 may be pushed towards one another in the axial direction. The direction of movement is indicated by a double arrow in FIG. 4. It should be pointed out at this stage, however, that there are also numerous other options not explicitly described here, which might be used to enable the connection interfaces 13, 14 to be coupled by an axial sliding movement.

The connection interfaces 13 and 14 may also each have a terminal surface profile that is not based on a flat shape. With this option, one connection interface 13 may have a portion in the shape of a male part and the other connection interface 14 may have a portion in the shape of a female part.

Figure 6:
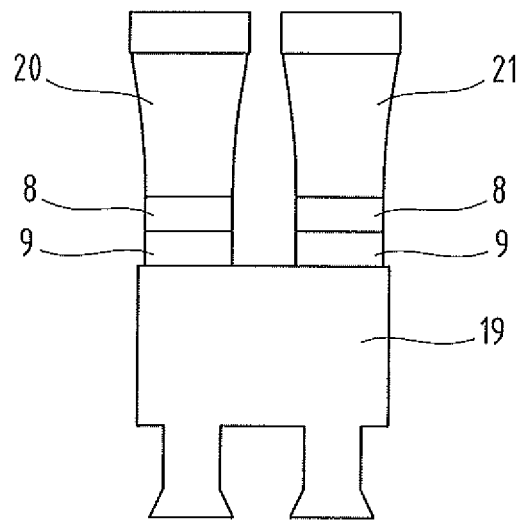
FIG. 6 is an embodiment of a telescope proposed by the invention with two lenses and a binocular.

As illustrated in FIG. 6, one or more switches 17 may be provided on one of the connection interfaces 4, 5 which are operated when the connection interfaces 4, 5 are correctly connected. This enables a control signal to be generated, which signals to an output unit, for example an LED, that the connection interfaces 4 and 5 have been correctly connected.

It would also be possible to provide several switches 17, whereby when the connection interfaces 4 and 5 are in a connected state, a predefined combination of the switches is operated. An electrical contact between the lens module 2 and eyepiece module 3 or a data connection between the lens module 2 and eyepiece module 3 may be established depending on whether the switches 17 are operated in the predefined combination. This enables a coding to be created, which permits only the use of original parts. The switches 17 are preferably provided in the form of reed switch contacts. This being the case, magnets 18 may be provided at points of the connection interfaces 4, 5 cooperating with the switches 17. By connecting the connection interfaces 4 and 5, the switches 17 may be closed due to the effect of the magnetic fields. If provided in the form of reed switch contacts, the switches 17 may also be disposed below the surface of the respective connection interface 4 or 5 so that they are not visible from outside.

Figure 7:
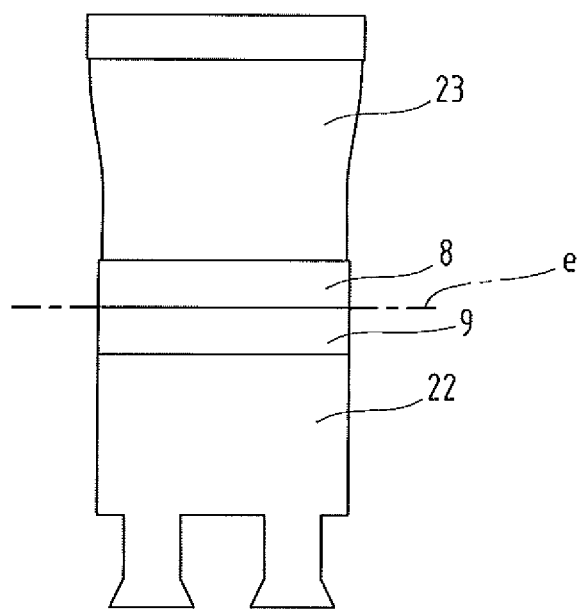
FIG. 7 is an embodiment of a telescope proposed by the invention with one lens and a binocular.

As illustrated in FIG. 6, the eyepiece module 19 may also be designed as a binocular. To enable stereoscopic viewing, it would also be possible in this case to use two lens modules 20, 21 or one lens module with two lenses. However, it is also possible to use a binocular 22 with a single lens module 23, as illustrated in FIG. 7.

Figure 8:
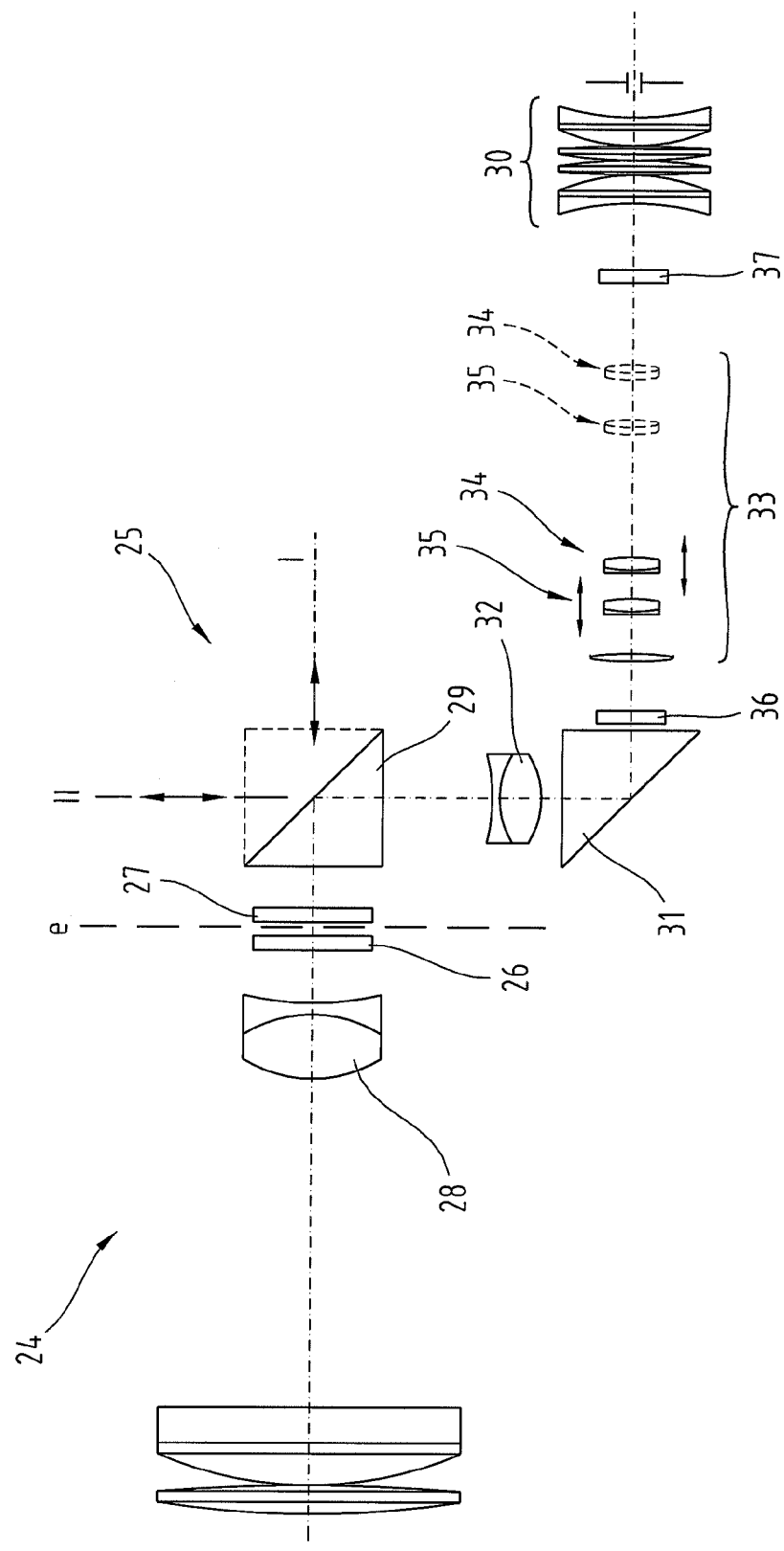
FIG. 8 is a first variant of an optical design of a telescope proposed by the invention.

FIG. 8 illustrates an example of a first optical design of a telescope proposed by the invention. The lens module 24 and eyepiece module 25 may be separated from one another in a separation plane e or are connected to one another via their connection interfaces in the separation plane e. The lens module 24 may have an adjustable lens 28 which is used for focusing and can be operated via an adjusting means for focusing, for example one of the adjusting means for focusing described above.

At the mutually facing ends, the lens module 24 and eyepiece module 25 may have glass covers 26, 27. The two modules are taken apart between the two glass covers 27, and the connection interfaces, for example the connection interfaces forming a bayonet closure, may be disposed between the two glass covers 27.

The telescope proposed by the invention may have an offset, as illustrated in FIG. 8, for example. It would naturally also be possible for the telescope proposed by the invention to be of a straight design, as illustrated in FIGS. 9 and 10.

The eyepiece module may have a prism 29, by means of which information or other optical objects such as infra-red radiation, etc., may be coupled in or out in the direction of the lens. This will enable different optical functions to be operated by a process of coupling in or out via the prism 29 in the direction of the lens, such as a camera, distance measuring function, night vision function, etc. Reference I in FIG. 8 indicates the direction in which coupling in and out of the lens takes place.

Via the prism 29, it is also possible to couple various things in or out in the direction of the eyepiece 30. The coupling in and out direction of the lens is indicated by reference II in FIG. 8. For example, the display of an image screen, a target mark, etc., may be displayed in the eyepiece optical path. A deflector prism 31 may also be provided in order to deflect the beam leaving the prism 29 in the direction of the eyepiece 30. The coupling in and out process may naturally also take place at the second prism 31 or alternatively at both prisms 29 and 31 at the same time in the same way.

A lens 32 may be provided between the two prisms 29 and 31 for correcting the image. However, it is not absolutely necessary to provide the lens 32 in the case of the embodiment illustrated.

The telescope proposed by the invention may also have a lens reversing system 33. The lens reversing system 33 may have two displaceable lens groups 34 and 35, for example, which are illustrated in FIG. 8 in two different zoom positions. The displaceable lens groups 34 and 35 may be operated via an adjusting means for zooming, for example one of the adjusting means for zooming mentioned above.

Intermediate image planes lie before and after the lens reversing system. Graticule plates 36 and 37 may be provided in these intermediate image planes.

It should be mentioned at this point that the lens groups illustrated are shown purely by way of example and represent only one of several possible embodiments. It would also be possible to use flat mirrors instead of the prisms.

As illustrated in FIG. 9, the telescope proposed by the invention may also be of a straight design. In this case, optical objects can also be coupled in or out, for example information in image format or electromagnetic waves, for example from the infra-red range, etc., in the direction of the lens 24 or eyepiece 30 by means of a single prism 38.

If it is not necessary to couple optical variables or objects in or out, it is also possible to opt for the design illustrated in FIG. 10 without a prism.

The embodiments illustrated as examples represent possible variants of the telescope proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

For the sake of good order, finally, it should be pointed out that, in order to provide a clearer understanding of the structure of the telescope, it and its constituent parts are illustrated to a certain extent out of scale and/or on an enlarged scale and/or on a reduced scale.

The invention claimed is:

1. A telescope comprising a lens module and an eyepiece module, and the lens module and eyepiece module have connection interfaces cooperating directly with one another for connecting and separating the modules from each other, wherein the connection interface of the lens module cooperates directly with the connection interface of the eyepiece module, and wherein at mutually facing ends of the lens module and of the eyepiece module glass covers are provided, and adjusting means for focusing and adjusting means for changing the image magnification are provided, wherein one of the adjusting means is disposed on the lens module in a region of the connection interface of the lens module and the other one of the adjusting means is disposed on the eyepiece module in the region of the connection interface of the eyepiece module, wherein the adjusting means for focusing and for changing the image magnification comprise setting rings, end faces of which lie in planes parallel with one another and the setting ring of the means for focusing and the setting ring of the means for changing the image magnification are close to one another in spatial terms enabling a user to operate both of the setting rings simultaneously with one hand.

2. The telescope according to claim 1, wherein at least portions of the adjusting means for focusing and for changing the image magnification lie in a plane between the connection interfaces.

3. The telescope according to claim 1, comprising a bayonet closure formed by the connection interfaces directly cooperating with one another.

4. The telescope according to claim 1, comprising two connection interfaces cooperating directly with one another to form a plug and socket connection, which can be released by an axial sliding action of the connection interfaces if a retaining element, which is operated by at least one operating element and connecting the connection interfaces to one another, is pushed back by means of the operating element into a releasing position.

5. The telescope according to claim 1, comprising two connection interfaces cooperating directly with one another including a surface profile that is not a flat shape, and one connection interface is in the shape of a male part in at least certain portions and the other interface is in the shape of a female part in at least certain portions.

6. The telescope according to claim 1, comprising at least one switch arranged on at least one of the connection interfaces, which is operated when the connection interfaces are connected.

7. The telescope according to claim 6, comprising a plurality of switches, and when the connection interfaces are in a connected state a combination of the switches is operated, and an electrical contact between the lens module and eyepiece module and/or a data connection between the lens module and eyepiece module is not established until the switches are operated in said combination.

8. The telescope according to claim 7, wherein the switches comprise reed switch contacts.

9. The telescope according to claim 1, wherein the eyepiece module comprises a distance measuring function, a photo function, a video function or a night vision function.

10. The telescope according to claim 9, wherein the functions of the eyepiece module are operated using a viewing passage of the lens module.

11. The telescope according to claim 1, comprising an eyepiece optical system integrated in the eyepiece module.

* * * * *